United States Patent
Kueper

(10) Patent No.: US 7,154,731 B1
(45) Date of Patent: Dec. 26, 2006

(54) REFLECTIVE COATING FOR ELECTROSTATIC CHUCKS

(75) Inventor: Timothy W. Kueper, San Jose, CA (US)

(73) Assignee: Novellus Systems, Inc., San Jose, CA (US)

( * ) Notice: Subject to any disclaimer, the term of this patent is extended or adjusted under 35 U.S.C. 154(b) by 594 days.

(21) Appl. No.: 10/623,445

(22) Filed: Jul. 18, 2003

(51) Int. Cl.
*H02N 13/00* (2006.01)

(52) U.S. Cl. ............................................. 361/234
(58) Field of Classification Search ................ 361/234
See application file for complete search history.

(56) References Cited

U.S. PATENT DOCUMENTS

| | | | |
|---|---|---|---|
| 5,841,624 A * | 11/1998 | Xu et al. ............... | 361/234 |
| 6,115,232 A * | 9/2000 | Hass et al. ............ | 361/234 |
| 6,426,860 B1 * | 7/2002 | Schubert et al. ...... | 361/234 |
| 6,916,559 B1 * | 7/2005 | Murakawa et al. ... | 428/697 |

* cited by examiner

*Primary Examiner*—Burton S. Mullins
*Assistant Examiner*—Lucy Thomas
(74) *Attorney, Agent, or Firm*—Okamoto & Benedicto LLP

(57) ABSTRACT

In one embodiment, an electrostatic chuck includes a body having a top surface facing a wafer and a reflective coating over the top surface. The reflective coating is formed on areas of the top surface that do not contact a wafer so as to not appreciably affect the clamping function of the electrostatic chuck. The reflective coating helps raise the operating temperature of the wafer by reflecting heat radiated from the wafer back onto the wafer. In one embodiment, the reflective coating comprises a material that is relatively good in reflecting radiation in the infrared region.

20 Claims, 6 Drawing Sheets

REFLECTIVE COATING FOR ELECTROSTATIC CHUCKS

BACKGROUND OF THE INVENTION

1. Field of the Invention

The present invention relates generally to wafer processing systems, and more particularly but not exclusively to electro-static chucks employed in such systems.

2. Description of the Background Art

Electrostatic chucks are employed to support wafers in a variety of wafer processing systems. In a high-density plasma chemical vapor deposition (HDP-CVD) system, for example, an electrostatic chuck clamps a wafer in place while a thin film is deposited on the wafer. An electrostatic chuck is so named because it clamps a wafer by electrostatic force.

FIG. 1A schematically show an example electrostatic chuck 110. Electrostatic chuck 110 includes a body 119, which includes contact points 112 for contacting a backside of a wafer 101. Only some of contact points 112 are labeled in FIG. 1A to avoid cluttering the figure. Contact points 112 may comprise raised areas to allow a cooling gas (e.g., helium) to be flowed under wafer 101 between contact points 112. Body 119 and its contact points 112 are made of a dielectric material, such as a ceramic. Wafer 101, body 119, and electrodes buried in body 119 (see electrodes 114 and 116 in FIG. 1C) form a capacitor that clamps wafer 101 in place when the electrodes are energized. Electrostatic chuck 110 may be a so-called Johnson-Rahbeck electrostatic chuck. A Johnson-Rahbeck electrostatic chuck includes a leaky dielectric body that allows charge to migrate from the electrodes to the surface of contact points 112.

FIG. 1B is a top sectional view schematically showing the general location of the bipolar electrodes of electrostatic chuck 110. FIG. 1B shows body 119 with its top surface removed. Referring to FIG. 1B, an electrode 114 and an electrode 116 are separated by an electrode gap 115. Electrode 114 may be energized to a voltage of one polarity, while electrode 116 may be energized to a voltage of an opposite polarity.

FIG. 1C is a side sectional view schematically showing electrodes 114 and 116 buried in body 119. Note that FIGS. 1A–1C are not drawn to scale. As shown in FIG. 1C, a rod 117 is coupled to electrode 114 for applying a voltage thereon. Another rod (not shown) is coupled to electrode 116. Electrode gap 115 prevents the two electrodes from shorting. When electrodes 114 and 116 are energized by applying voltages on them (e.g., +1000 volts on electrode 114 and −1000 volts on electrode 116), a voltage potential develops on the top surface of body 119 including on the tips of contact points 112 (i.e., 112-1, 112-2, . . . ). This results in an electrostatic force that clamps the wafer onto contact points 112.

SUMMARY

In one embodiment, an electrostatic chuck includes a body having a top surface facing a wafer and a reflective coating over the top surface. The reflective coating is formed on areas of the top surface that do not contact a wafer so as to not appreciably affect the clamping function of the electrostatic chuck. The reflective coating helps raise the operating temperature of the wafer by reflecting heat radiated from the wafer back onto the wafer. In one embodiment, the reflective coating comprises a material that is relatively good in reflecting radiation in the infrared region.

These and other features of the present invention will be readily apparent to persons of ordinary skill in the art upon reading the entirety of this disclosure, which includes the accompanying drawings and claims.

Figure 1A:
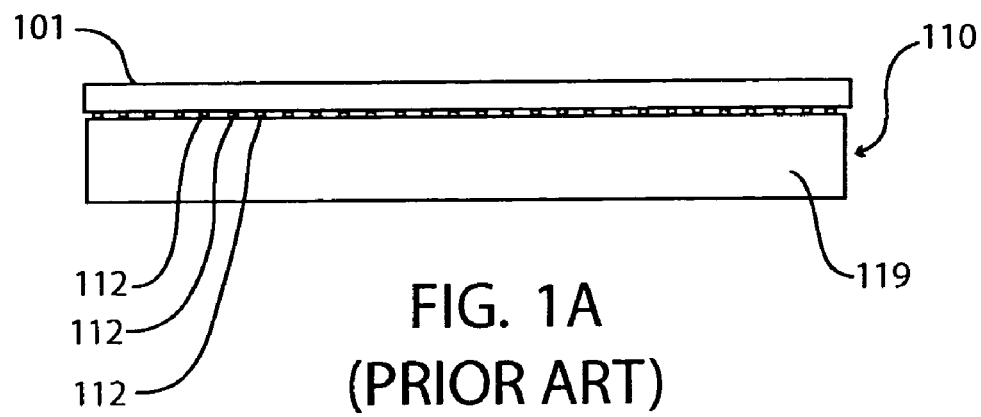
FIGS. 1A–1C schematically show an example electrostatic chuck.
Figure 1B:
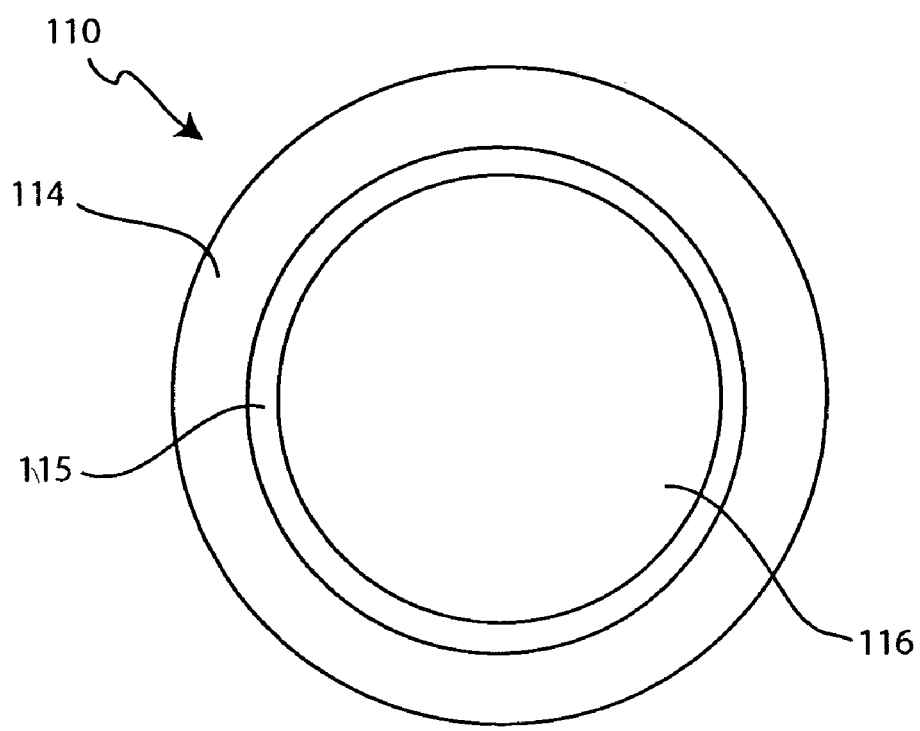
Figure 1C:
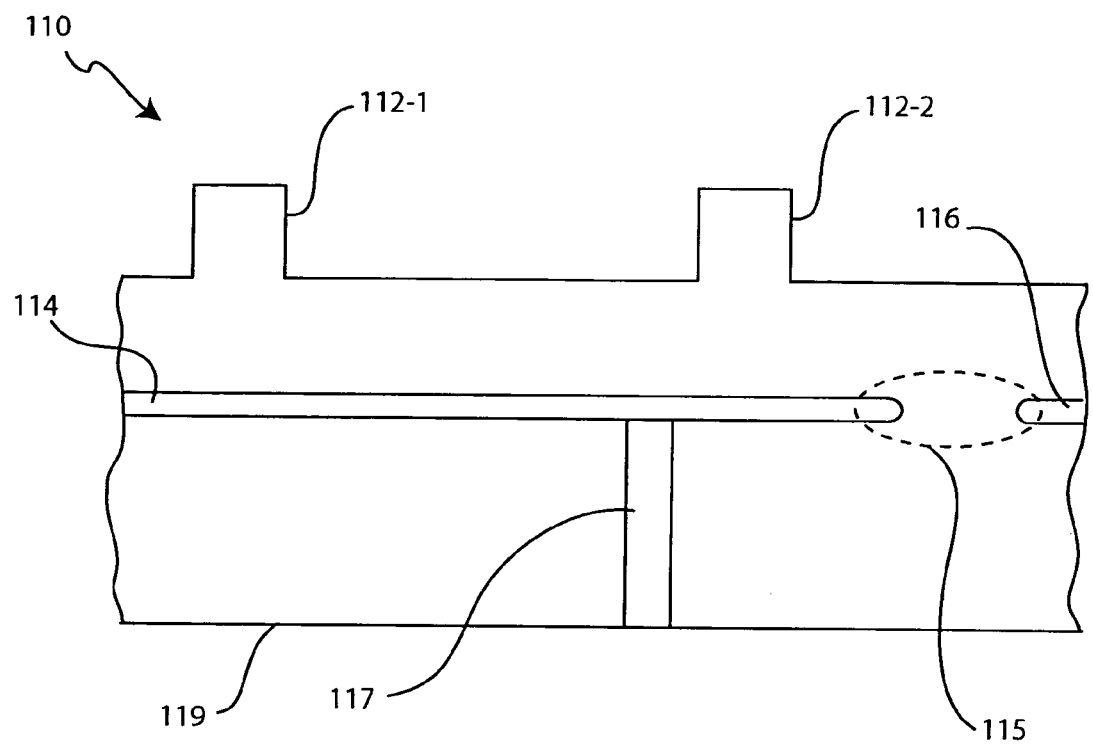

The use of the same reference label in different drawings indicates the same or like components. Drawings are not necessarily to scale unless otherwise noted.

DETAILED DESCRIPTION

In the present disclosure, numerous specific details are provided such as examples of apparatus, components, and methods to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

An electrostatic chuck typically has provisions for cooling a wafer. For example, an electrostatic chuck may have raised contact areas to allow a cooling gas to be flowed under the wafer. This allows the electrostatic chuck to be employed in processes where heat from a plasma, for example, is more than that required by the process. If a process calls for relatively high temperatures, the input power to the plasma may be increased. However, using the input plasma power as a heat control mechanism would complicate the control of the temperature of the wafer. Thus, it would be advantageous to be able to increase the operating temperature (i.e., temperature during processing) of the wafer without having to rely solely on increasing the input power to the plasma.

The operating temperature of a plasma-heated wafer is determined by the total heat removed by all cooling mechanisms in the system. For an HDP-CVD system, the important cooling mechanisms include the radiation from the top and bottom surfaces of the wafer and the contact cooling by a clamped electrostatic chuck. When no clamping is used, such as when the electrodes are not energized, the temperature of the wafer will rise until the total heat radiated by the wafer is equal to the total heat input to the wafer. A portion of the radiated heat will be radiated down to the top surface of the electrostatic chuck. Because the view factor between the wafer and the electrostatic chuck is approximately equal to 1, the energy flux from a hot wafer at a temperature $T_1$ to the cold electrostatic chuck at a temperature $T_2$ can be described by EQ. 1:

$$E_{r,1-2} = \sigma(T_1^4 - T_2^4)[\in_1 \in_2 / (\in_1 + \in_2 - \in_1 \in_2)] \quad \text{EQ. 1}$$

where $E_r$ is the radiation energy, $\sigma$ is the Stefan-Boltzmann constant, and $\in_1$ and $\in_2$ are the emissivities of the wafer and body of the electrostatic chuck, respectively. For comparison purposes, low-resistivity wafers typically have an $\in_1$ of about 0.68, while a ceramic body of a Johnson-Rahbeck electrostatic chuck has an $\in_2$ of about 0.95.

In embodiments of the present invention, the emissivity of the electrostatic chuck is lowered to allow more of the radiated wafer heat to be reflected back onto the wafer, thereby raising the operating temperature of the wafer. In one embodiment where approximately 80% of the top surface of the electrostatic chuck is covered with a reflective coating having an emissivity of about 0.05 (e.g., a layer of aluminum beneath a thin transparent layer of aluminum nitride layer), the overall emissivity of the electrostatic chuck may be lowered from about 0.95 down to about 0.3 or less. With this large drop in electrostatic chuck emissivity, more of the radiated wafer heat is reflected back to the wafer. For example, in an HDP-CVD system configured to run at an operating temperature of about 400° C., the large drop in electrostatic chuck emissivity increases the unclamped operating temperature of low-resistivity wafers by about 40° C.

Depending on the operating temperature of interest, high-resistivity wafers will have much lower emissivities compared to low-resistivity wafers. For example at temperatures of about 300° C. to about 700° C., the emissivities of high-resistivity wafers will be higher than that of low-resistivity wafers. It can be seen from EQ. 1 that the relatively high emissivities of high-resistivity wafers yield a relatively poor radiative heat transfer from the wafer to the electrostatic chuck. Therefore, a reflective coating on the top surface of the electrostatic chuck will make less significant difference in the operating temperature of a high-resistivity wafer. High-resistivity wafers run hotter than low-resistivity wafers to begin with, and a reflective coating may only add about 20° C. to the unclamped operating temperature of high-resistivity wafers in an HDP-CVD system running at about 480° C.

Figure 2:
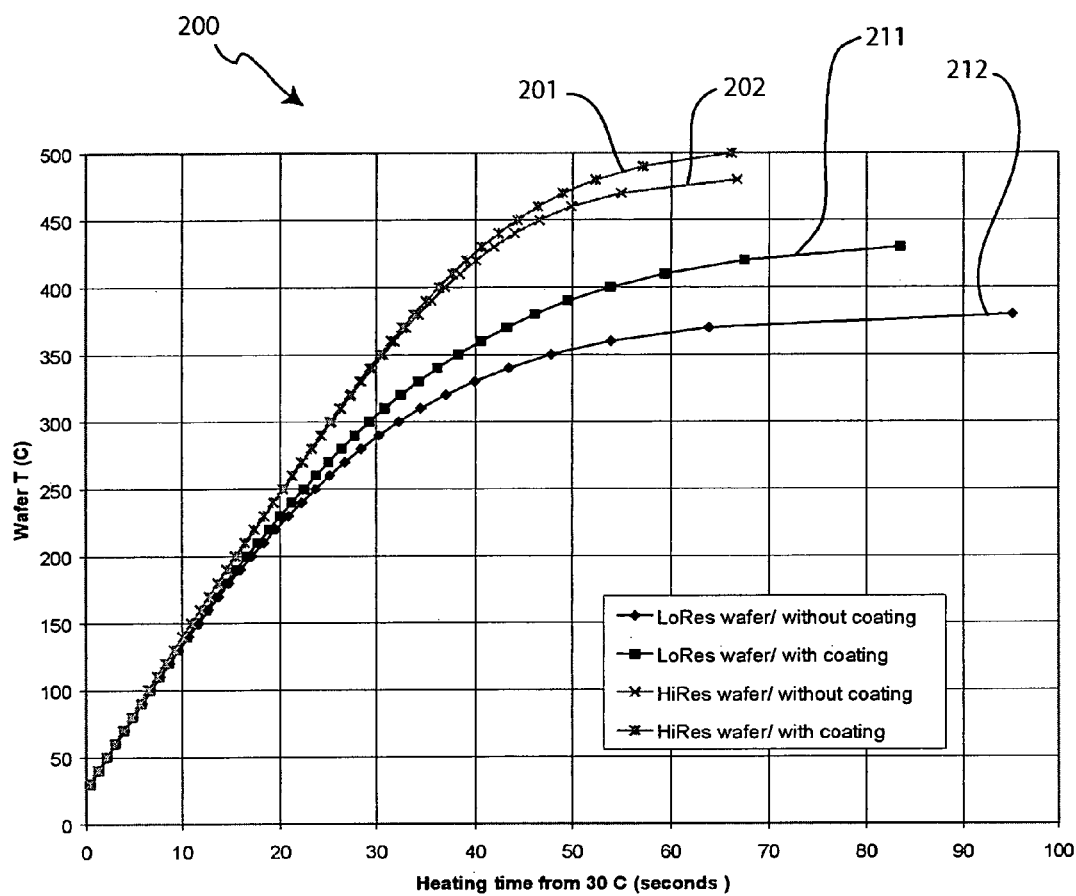
FIG. 2 shows an example graph of calculated wafer operating temperature for different wafer types and electrostatic chuck emissivities.

FIG. 2 shows an example graph 200 of calculated wafer operating temperature for different wafer types and electrostatic chuck emissivities. In graph 200, the vertical axis represents the wafer temperature in degrees Centigrade (° C.) and the horizontal axis represents heating time in seconds starting at a wafer temperature of 30° C. Plot 201 is for a high-resistivity wafer on a coated electrostatic chuck, plot 202 is for a high-resistivity wafer on an uncoated electrostatic chuck, plot 211 is for a low-resistivity wafer on a coated electrostatic chuck, and plot 212 is for a low-resistivity wafer on an uncoated electrostatic chuck. Data points for plots 201, 202, 211, and 212 are calculated using EQ. 1 assuming an unclamped wafer and the topside of the wafer radiates to vacuum. Heat transfer mechanisms other than radiation are assumed to be negligible to simplify the calculation. In graph 200, the coated electrostatic chuck is assumed to have an overall emissivity of about 0.3 at 50° C.; the uncoated electrostatic chuck is assumed to have an overall emissivity of about 0.95 at 50° C.; the low-resistivity wafer is assumed to have an emissivity of about 0.68; the high-resistivity wafer is assumed to have an emissivity of about 0.15 at 30° C. and about 0.4 at 500° C.; the wafers are about 300 mm in diameter, about 0.75 mm thick, have a density of about 2.33 g/cc, and have a heat capacity of about 710 J/kg.K for heat budgeting purposes for every 10° C. of heating; the plasma power input is about 1020 Watts; and the temperature of the electrostatic chuck is maintained at about 50° C.

As can be appreciated from the foregoing, coating the top surface of an electrostatic chuck with a reflective coating allows low-resistivity and high-resistivity wafers to have unclamped operating temperatures that are within a narrow temperature range, thereby simplifying the electrostatic chuck's clamping requirements for temperature control. Furthermore, a reflective coating on an electrostatic chuck allows for higher wafer temperature at lower plasma power inputs.

Figure 3:
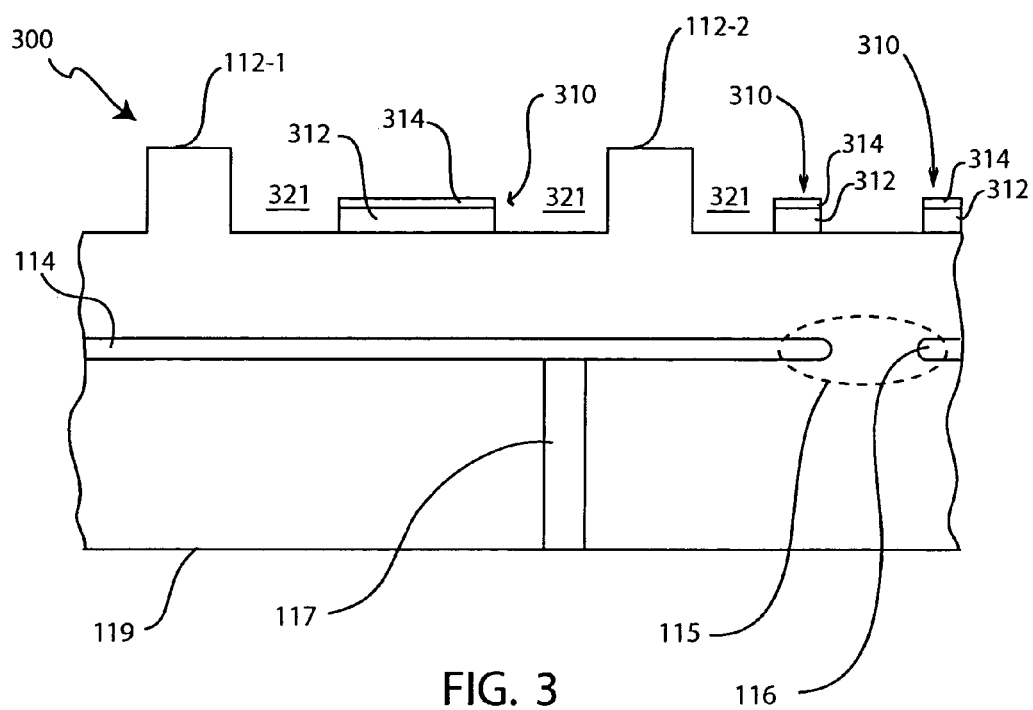
FIG. 3 schematically shows a side cross-sectional view of an electrostatic chuck in accordance with an embodiment of the present invention.

FIG. 3 schematically shows a side cross-sectional view of an electrostatic chuck 300 in accordance with an embodiment of the present invention. Note that FIG. 3 is not drawn to scale. In the example of FIG. 3, electrostatic chuck 300 is a Johnson-Rahbeck type electrostatic chuck. It should be understood, however, that embodiments of the present invention are not so limited. Embodiments of the present invention may also be employed in other types of electrostatic chucks. Also in the example of FIG. 3, body 119 may be made of a leaky dielectric material such as a ceramic, rod 117 may be made of tungsten, and electrodes 114 and 116 may be made of tungsten. Contact points 112 may be about 25 μm high and about 0.5 mm in diameter. Electrodes 114 and 116 may be buried about 1 mm from the top surface of body 119. An uncoated area 321 (see also FIG. 6) surrounding a contact point 112 may be between about 1.5 mm to about 3.5 mm wide. The just provided dimensions are merely examples, as they will vary depending on the particulars of the electrostatic chuck. The same reference labels in FIGS. 1A, 1B, 1C, and 3 denote components with similar structures and functions.

In one embodiment, a reflective coating 310 is not formed over contact areas (i.e., surfaces that make contact with a wafer) of body 119. This allows reflective coating 310 to reflect heat radiated by the wafer without appreciably affecting the clamping function of electrostatic chuck 300. For example, reflective coating 310 is not formed on the top of contact points 112. In one embodiment, reflective coating 310 is also not formed on uncoated areas 321 surrounding contact points 112 to further minimize the effect of reflective coating 310 on the clamping function of electrostatic chuck 300.

In one embodiment, reflective coating 310 comprises a reflecting layer 312 and a protective layer 314. Reflecting layer 312 may comprise a material that is relatively good in reflecting radiation in the infrared (IR) region of the electromagnetic spectrum. In one embodiment, reflecting layer 312 comprises a metal, such as aluminum. Reflecting layer 312 may also be made of other materials depending on the radiation to be reflected. Reflecting layer 312 lowers the overall emissivity of electrostatic chuck 300 by reflecting IR radiation from a wafer back to the wafer.

Protective layer 314 protects reflecting layer 312 from other materials present in the wafer processing system. Protective layer 314 is preferably kept relatively thin so as to be transparent. In one embodiment where electrostatic chuck 300 is employed in a wafer processing system where fluorine is used as a cleaning agent, protective layer 314 may comprise aluminum nitride. A protective layer 314 of aluminum nitride protects an underlying reflecting layer 312 of aluminum from being eroded away by the fluorine. Protective layer 314 may be made of other materials depending on the materials employed in the wafer processing system and on the composition of reflecting layer 312. Protective layer 314 may not be needed in some processes.

In one embodiment, a reflecting layer 312 of aluminum is formed to a thickness of about 150 nm by sputtering, while a protective layer 314 of aluminum nitride is formed to a thickness of about 50 nm by reactive sputtering. The aluminum nitride may be formed by introducing nitrogen in the sputtering chamber after the sputtering of the aluminum. A mask (not shown) may be formed over electrostatic chuck 300 prior to the sputtering of aluminum and aluminum nitride. The mask limits the formation of reflective coating 310 only on portions of electrostatic chuck 300 that do not contact the wafer. The mask may comprise a liquid mask used in screen printing. A stencil may be placed over electrostatic chuck 300 to cover areas where reflective coating 310 is to be formed. The liquid mask may then be applied on areas exposed by the stencil. Thereafter, the stencil is removed and the liquid mask is allowed to harden. Reflective coating 310 is then formed on areas of the top surface not covered by the mask. The mask is removed thereafter.

Figure 4:
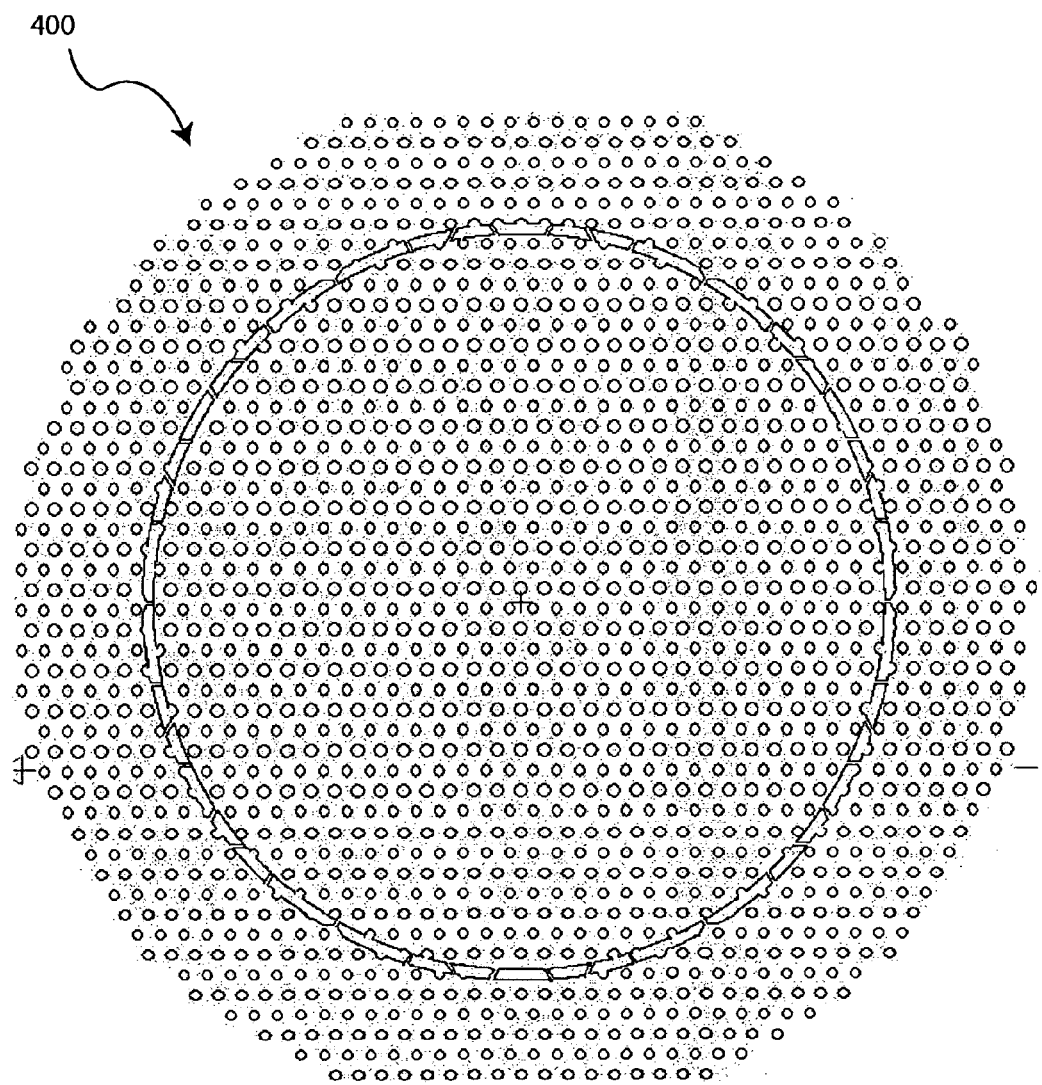
FIG. 4 schematically shows an example stencil that may be employed in applying a liquid mask on an electrostatic chuck.

FIG. 4 schematically shows an example stencil 400 for applying the liquid mask on an electrostatic chuck. Stencil 400 may be modified to match the features of a top surface of a particular electrostatic chuck.

Reflective coating 310 may be divided into several discontinuous sections to prevent shorting in areas of body 119 where electrical isolation is to be maintained. Referring to FIG. 3 as an example, coating 310 may have two sections that are separated over electrode gap 115. In the example of FIG. 3, a first section includes coating 310 over electrode 114, while a second section includes coating 310 over electrode 116.

Figure 5:
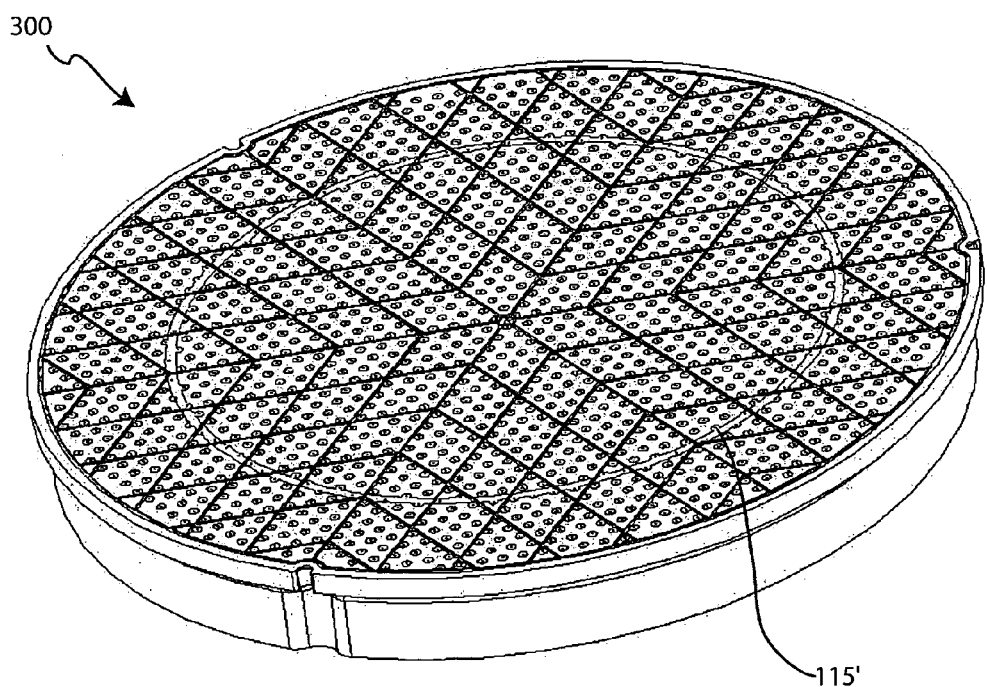
FIG. 5 shows a perspective view of an electrostatic chuck in accordance with an embodiment of the present invention.

FIG. 5 is a perspective view of electrostatic chuck 300 showing a demarcation ring 115'. Demarcation ring 115' is so labeled because it denotes the general location where electrode gap 115 is in body 119. The inner circular area within demarcation ring 115' shows the second section of coating 310, while the outer circular area outside demarcation ring 115' shows the first section of coating 310.

Figure 6:
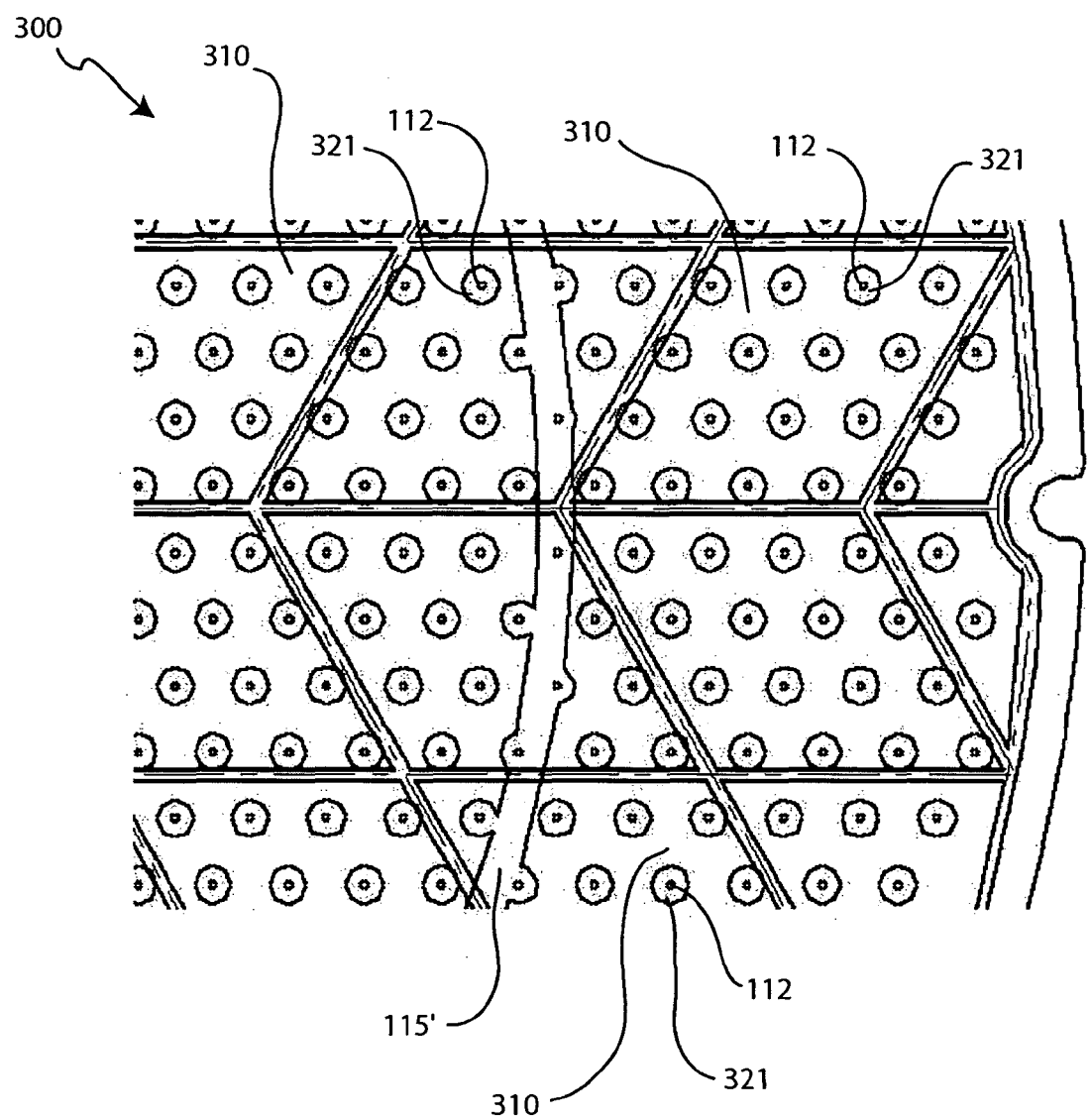
FIG. 6 shows a magnified view of a top surface of the electrostatic chuck of FIG. 5.

FIG. 6 shows a magnified view of the top surface of electrostatic chuck 300. FIG. 6 shows demarcation ring 115' and contact points 112 surrounded by uncoated areas 321. Only some of contact points 112 and uncoated areas 321 are labeled in FIG. 6 in the interest of clarity.

While specific embodiments of the present invention have been provided, it is to be understood that these embodiments are for illustration purposes and not limiting. For example, the present invention may be used in wafer processing systems other than HDP-CVD systems. Many additional embodiments will be apparent to persons of ordinary skill in the art reading this disclosure.

What is claimed is:

1. In a wafer processing system, an electrostatic chuck comprising:
   a body having a top surface configured to directly face a backside of a wafer;
   an electrode buried in the body; and
   a reflective metal coating over the top surface.

2. The electrostatic chuck of claim 1 wherein the top surface integrally includes raised contact points configured to contact the wafer and the reflective coating does not go over the raised contact points, the raised contact portions and the top surface being of a same piece of material.

3. The electrostatic chuck of claim 1 wherein the reflective coating does not go over portions of the electrostatic chuck that make contact with the wafer.

4. The electrostatic chuck of claim 1 wherein the body is made of a leaky dielectric material.

5. The electrostatic chuck of claim 1 wherein the leaky dielectric material comprises alumina.

6. The electrostatic chuck of claim 1 wherein the reflective coating reflects radiation in an infrared (IR) region.

7. The electrostatic chuck of claim 1 wherein the reflective coating comprises aluminum.

8. The electrostatic chuck of claim 1 wherein the reflective coating comprises:
   a metal layer over the top surface; and
   a protection layer over the metal layer.

9. The electrostatic chuck of claim 1 wherein the metal layer comprises aluminum and the protection layer comprises aluminum nitride.

10. A method of supporting a wafer in a wafer processing system, the method comprising:
    holding a wafer onto a body of an electrostatic chuck, the wafer having a backside directly facing the top surface of the electrostatic chuck; and
    reflecting heat from the backside of the wafer off a reflective metal coating and back onto the backside of the wafer.

11. The method of claim 10 wherein heat is reflected off portions of the body that do not contact the wafer.

12. The method of claim 10 wherein the reflective coating comprises a metal.

13. The method of claim 10 wherein the reflective coating comprises a metal over the body and a protective layer over the metal.

14. The method of claim 12 wherein the metal comprises aluminum.

15. The method of claim 13 wherein the metal comprises aluminum and the protective layer comprises aluminum nitride.

16. An apparatus for supporting a wafer in a wafer processing system, the apparatus comprising:
    a body comprising a dielectric material, the body including a top surface integrally including raised portions configured to contact a wafer, the top surface directly facing a backside of the wafer;
    an electrode buried in the body; and
    a reflective coating over portions of the top surface that do not contact the wafer.

17. The apparatus of claim 16 wherein the reflective coating comprises a metal.

18. The apparatus of claim 16 wherein the reflective coating comprises:
    a metal; and
    a protective film over the metal.

19. The apparatus of claim 16 wherein the reflective coating comprises two discontinuous sections corresponding to bipolar electrode regions buried in the body.

20. The apparatus of claim 17 wherein the metal comprises sputtered aluminum.

* * * * *